Figure 1:
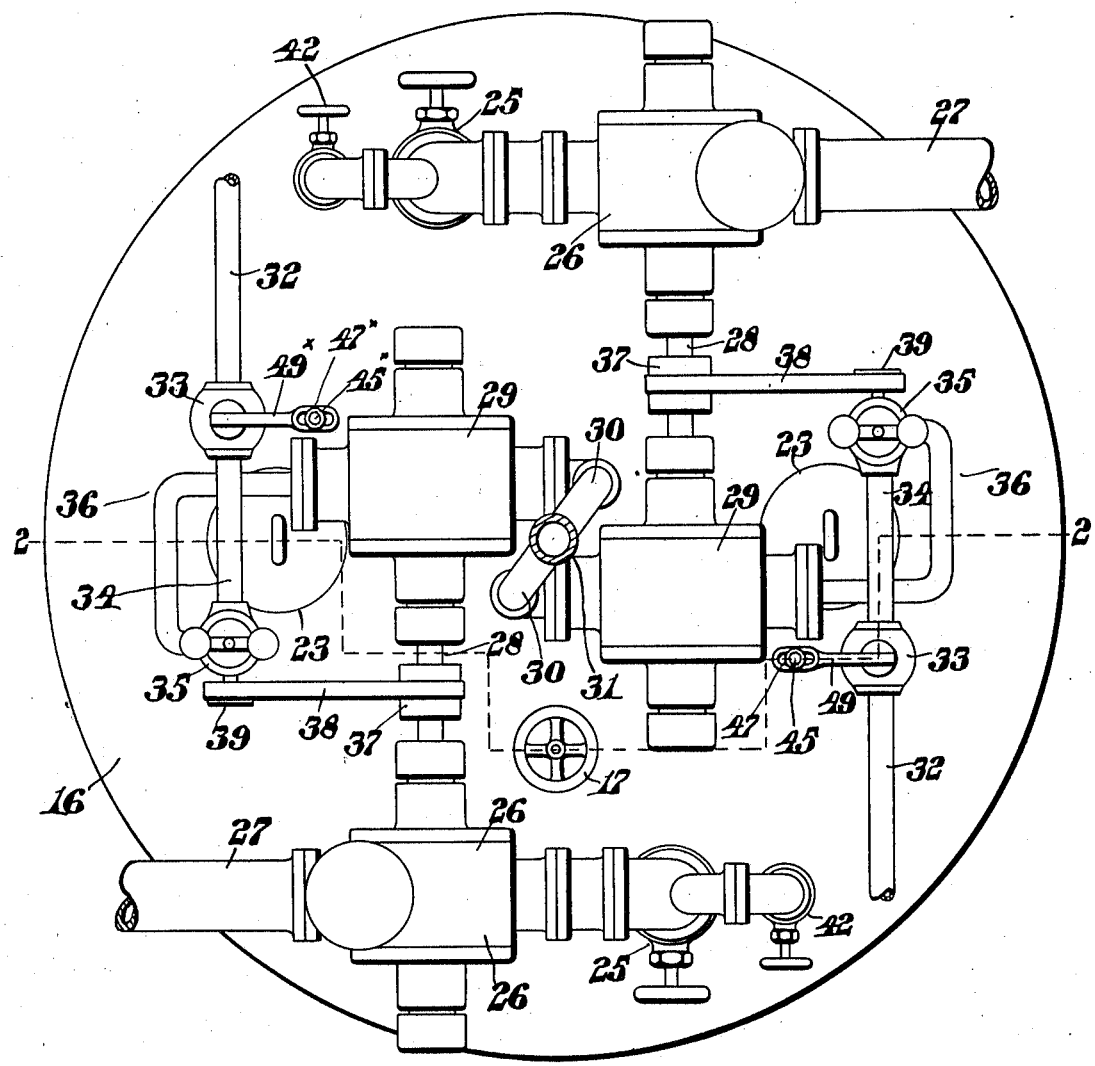

J. R. KINNEY.
CONTROL FOR SEWAGE AND OTHER PUMPS.
APPLICATION FILED SEPT. 26, 1910.

1,003,757.

Patented Sept. 19, 1911.
3 SHEETS—SHEET 1.

Witnesses:
Nathan C. Lombard.
Mary C. Smith.

Inventor:
Justus R. Kinney,
by Walter E. Lombard,
Atty.

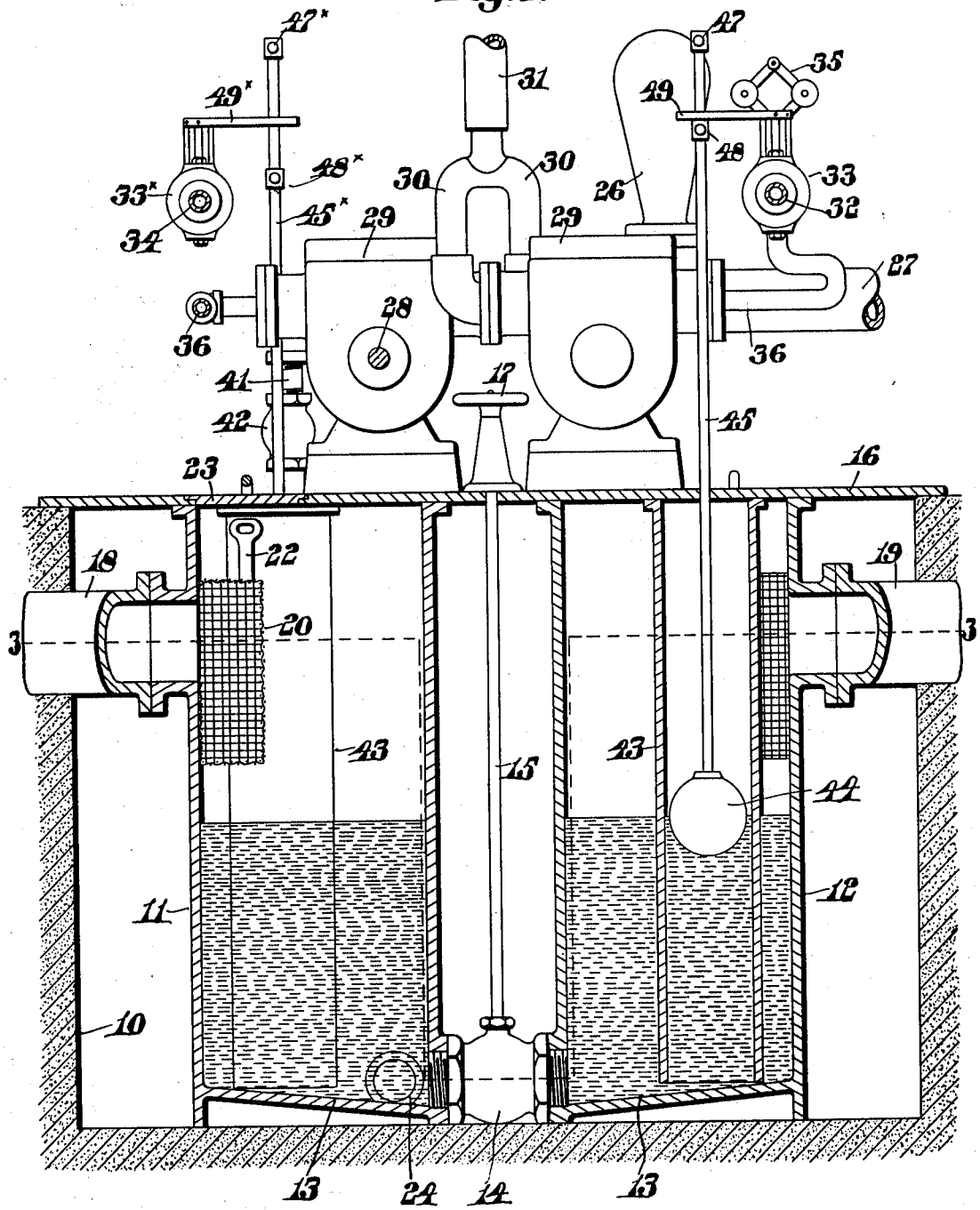

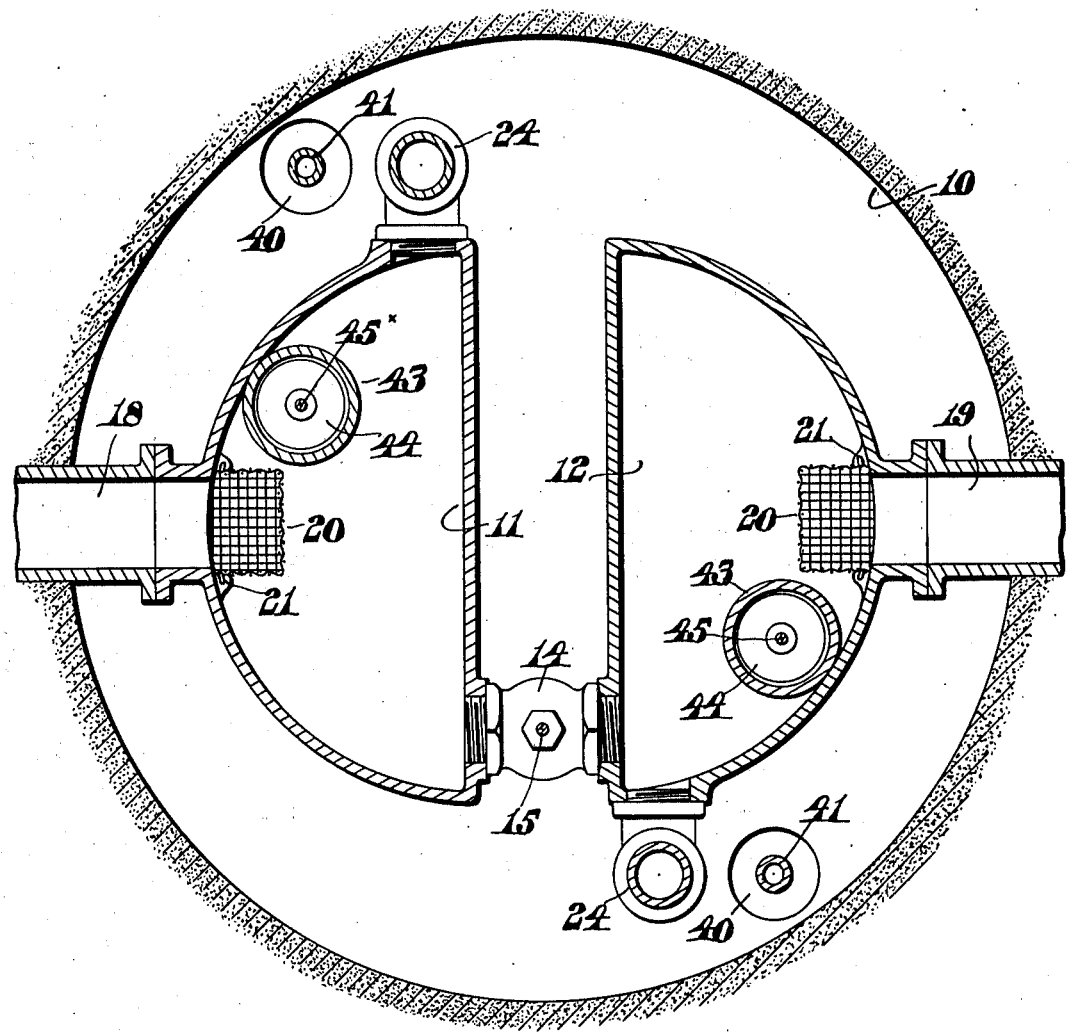

UNITED STATES PATENT OFFICE.

JUSTUS R. KINNEY, OF BOSTON, MASSACHUSETTS.

CONTROL FOR SEWAGE AND OTHER PUMPS.

1,003,757.  Specification of Letters Patent. Patented Sept. 19, 1911.

Application filed September 26, 1910. Serial No. 583,955.

*To all whom it may concern:*

Be it known that I, JUSTUS R. KINNEY, a citizen of the United States of America, and a resident of Boston, in the county of Suffolk and State of Massachusetts, have invented certain new and useful Improvements in Control for Sewage and other Pumps, of which the following is a specification.

This invention relates to automatic sewage ejectors, and has for its object the production of an apparatus especially adapted for pumping sewage from buildings having basements below the level of the sewer.

The invention consists of certain novel features of construction and arrangement of parts which will be readily understood by reference to the description of the drawings and to the claims hereinafter given.

Of the drawings: Figure 1 represents a plan view of an apparatus embodying the features of the present invention. Fig. 2 represents a vertical section of the same, the cutting plane being on line 2, 2 on Fig. 1, and Fig. 3 represents a horizontal section of the same, the cutting plane being on line 3, 3 on Fig. 2.

Similar characters designate like parts throughout the several figures of the drawings.

In the drawings 10 represents a pit or chamber in the basement of a building from which the sewage is to be removed. Positioned within the pit 10 are two reservoirs or tanks, 11 and 12, each having an inclined bottom, 13. The extreme lower ends of the reservoirs 11 and 12 are connected by means of a valve 14, having a valve stem 15, extending upwardly above the pit cover 16 and provided at its extreme upper end with a handle 17, by which said valve 14 may be operated to shut off the communication between said reservoirs or tanks 11 and 12, or open the passage from one tank to the other, as desired. An inlet pipe, 18, communicates with the interior of the tank 11, and a similar inlet pipe 19, communicates with the other tank 12.

Within the tanks 11 and 12 and opposite the mouths of the inlet pipes 18 and 19, are woven baskets 20. These baskets 20 are made up of wire mesh with the bottoms of the baskets some distance below the mouths of the inlet pipes 18 and 19, so that any solid substance entering the tanks 11 and 12 from the inlet pipes 18 and 19 will be collected in said baskets 20, and prevented from passing to the bottoms of said tanks, it being apparent that only the liquid matter entering the tanks 11 and 12 will be permitted to collect at the bottom of said tanks, as indicated in Fig. 2 of the drawings. These baskets 20 are slidably mounted in the guides 21 formed upon or secured to the inner wall of the tanks 11 and 12, and each basket is provided with a handle 22 by which it may be moved upwardly on the guides 21, and through the hand-hole in the cover 16, said hand-holes being normally covered by removable plates 23.

A suction pipe 24 communicates with the extreme lower end of each of the tanks 11 and 12, and extends upwardly in the pit 10 through the pit cover 16, said suction pipe 24 being provided with a valve 25 of any well-known construction adapted to regulate the flow of material through said pipe. The upper end of the pipe 24 is connected to a rotary pump 26 which pump is provided with an outlet 27. Each pump 26 is provided with a driving shaft 28 which is driven by a suitable engine 29. Preferably, and as indicated in the drawings, this engine is a rotary engine, and the two engines 29 are connected by pipes 30 to a common exhaust pipe 31. Each engine 29 has an independent steam inlet pipe 32, communicating with a balanced valve 33. The outlet pipe 34 from said balanced valve communicates with a governor 35, of any well-known construction, and this governor 35 is provided with an outlet pipe 36 communicating with and supplying steam to the engine 29. On each shaft 28 is secured a pulley 37, connected by a belt 38 to the pulley 39 on the governor 35, so that any rotary movement of the shaft 28 is imparted to the governor 35 in the usual manner, and regulates the flow of the motive agent from the pipe 34 to the pipe 36. In the bottom of the pit 10 is a depression 40, into which extends the lower end of the pipe 41 connected to the pipe 24 and provided with a valve 42. It is obvious that when the pump is in operation and the valve 42 is open the pit may be pumped out. Normally the valve 42 is closed and all sewage is contained within the tanks 11 and 12, each of which is provided with its independent pumping apparatus.

By closing the valve 14 each system may be operated independently of the other, the inlet pipe 18 carrying sewage to one of the tanks from one part of the building, and the inlet pipe 19 carrying sewage from another part of the building to the other tank. It is also possible that both inlet pipes 18 and 19 may care for the sewage from all parts of the building, or one pipe may be closed and the other remain open, thereby using only one tank 11 or 12, as desired, affording an opportunity to clean out or repair the other tank or its pumping apparatus. In case, however, the sewage flows in too great a quantity for one tank 11 or 12 and its pumping apparatus to take care of it, the valve 14 may be opened and the sewage collected in both tanks.

Depending from the under side of the cover 16 into each of the tanks 11 and 12 is a tubular guide member 43, in which is mounted a float 44 having a stem 45 extending upwardly through the cover 16. Adjustably mounted upon the stem 45 are the projecting members 47 and 48, which are adapted in the vertical movement of the stem 45, due to the rise and fall of the float 44 to engage with the controlling lever 49 for regulating the operations of the balanced valve 33. It is obvious, therefore, that by adjusting these projections 47 and 48 on the stem 45 and locating them in predetermined positions, whenever the level of the sewage in the tank 12 reaches a given point carrying the float 44 therewith, the projection 48 will engage the controlling lever 49 of the balanced valve 33 and cause it to operate to admit steam to the engine 29, thereby operating the pump 26 for the purpose of removing the sewage from said tank. As this is accomplished the float 44 will gradually drop to such a level as will cause the projection 47 to engage the controlling lever 49 and cause the operation of the balanced valve to shut off the supply of steam to the engine 29, and thus cause the pumping to cease.

When the valve 14 is open, thus providing communication from one tank 11 to the other 12, and the sewage flows so rapidly into the tanks 11 and 12 that a single pump is incapable of removing it as quickly as it enters said tanks, it is desirable that some automatic arrangement be provided for placing in action an additional pump. This can readily be accomplished by providing the float stem 45$^x$ with adjustable projections 47$^x$ and 48$^x$ that will engage the controlling lever 49$^x$ on the balanced valve 33$^x$ a little later than the contact is made between the projection 48 and the controlling lever 49. In other words, if the projection 48 engages with the controlling lever 49 of the balanced valve 33, and sets into operation one pump, and this pump is capable of carrying off the sewage entering the tanks as fast as it is deposited therein, the projection 48$^x$ will never contact with the controlling lever 49$^x$, and one pump will therefore remain at rest, but if the supply of sewage enters the tanks more rapidly than the single pump can remove it from the tanks, it is obvious that the level of the sewage in the tanks will continue to rise, thereby lifting the projection 48$^x$ to such a point as to engage the controlling lever 49$^x$ and cause the other pump to be placed in operation. The two pumps will then continue in operation until the level of the sewage is lowered sufficiently for the projections 47, 47$^x$ to engage the controlling levers 49, 49$^x$ thereby stopping the pumps.

It is believed that the operation and many advantages of a device of this construction will be readily understood without any further description.

Having thus described my invention, I claim:

1. An apparatus of the character described comprising two reservoirs; a discharge pipe from each; a pump connected to each discharge pipe; mechanism for driving said pumps; a valve interposed between said reservoirs and forming means for communication between them; and means controlled by the height of the liquid within said reservoirs adapted to automatically and successively start and stop said pumps.

2. An apparatus of the character described comprising two reservoirs provided with a communicating passage from one to the other; a discharge pipe from each; a pump connected to each discharge pipe; an engine for driving each of said pumps; a balanced valve for controlling the operation of each engine; and means controlled by the height of liquid within the reservoirs arranged to automatically and successively operate said balanced valves.

3. An apparatus of the character described comprising two reservoirs provided with a communicating passage from one to the other; a plurality of discharge pipes therefrom; a pump connected to each discharge pipe; an engine for driving each of said pumps; a balanced valve for controlling the operation of each engine; floats in said reservoirs; and means connected to said floats and controlled by the height of liquid within the reservoirs arranged to automatically and successively operate said balanced valves.

4. An apparatus of the character described comprising two reservoirs provided with a communicating passage from one to the other; a plurality of discharge pipes therefrom; an engine for driving each of said pumps; a balanced valve for controlling the operation of each engine; and rods provided with devices at different heights for operating said balanced valves and connected to said floats whereby the height of the liquid within said reservoirs will automatically and successively operate said pumps.

5. An apparatus of the character described comprising two reservoirs provided with a communicating passage from one to the other; a plurality of discharge pipes therefrom; a pump connected to each discharge pipe; an engine for driving each pump; a balanced valve for controlling the operation of each engine; a float in each reservoir; a rod secured thereto; and members adjustably secured to said rods for actuating said balanced valves.

6. An apparatus of the character described comprising two reservoirs provided with a communicating passage from one to the other; a plurality of discharge pipes therefrom; a pump connected to each discharge pipe; an engine for driving each pump; a balanced valve for controlling the operation of each engine; a float in each reservoir; and connections leading from said floats and provided with devices for operating said balanced valves at predetermined heights of the liquid within said reservoirs.

7. An apparatus of the character described comprising two reservoirs provided with a communicating passage from one to the other; a valve for closing said communicating passage; a plurality of discharge pipes therefrom; a pump connected to each discharge pipe; an engine for driving each pump; a balanced valve for controlling the operation of each engine; a float in each reservoir; and connections leading from said floats and provided with devices for operating said balanced valves at predetermined heights of the liquid within said reservoirs.

8. An apparatus of the character described comprising two reservoirs provided with a communicating passage from one to the other; a plurality of discharge pipes therefrom; a pump connected to each discharge pipe; an engine for driving each pump; a balanced valve for controlling the operation of each engine; a float in each reservoir; a tubular guide for each float extending downwardly in each reservoir; and connections leading from said floats and provided with devices for operating said balanced valves at predetermined heights of the liquid within said reservoirs.

9. An apparatus of the character described comprising two reservoirs; a discharge pipe from each; a pump connected to each discharge pipe; mechanism for driving said pumps; means for connecting and disconnecting said reservoirs; and means controlled by the height of the liquid within said reservoirs whereby either pump may operate to withdraw the fluid from its own reservoir or from both reservoirs independently of the other pump or both pumps may unite to withdraw the fluid from both of said reservoirs simultaneously.

Signed by me at 4 Post Office Sq., Boston, Mass., this 21st day of September, 1910.

JUSTUS R. KINNEY.

Witnesses:
WALTER E. LOMBARD,
NATHAN C. LOMBARD.